United States Patent
Itoh

(10) Patent No.: US 8,070,239 B2
(45) Date of Patent: Dec. 6, 2011

(54) REGENERATIVE BRAKING COORDINATION DEVICE

(75) Inventor: Akihiro Itoh, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 994 days.

(21) Appl. No.: 12/015,549

(22) Filed: Jan. 17, 2008

(65) Prior Publication Data

US 2008/0173490 A1    Jul. 24, 2008

(30) Foreign Application Priority Data

Jan. 20, 2007 (JP) ................................. 2007-010894
Dec. 26, 2007 (JP) ................................. 2007-333930

(51) Int. Cl.
*B60T 8/64* (2006.01)

(52) U.S. Cl. ..................................... 303/152; 303/114.3

(58) Field of Classification Search ............... 303/114.3, 303/152, 4, 113.3, 113.4, 115.1, 115.2, 122.11, 303/118.1, 154
See application file for complete search history.

(56) References Cited

U.S. PATENT DOCUMENTS

| | | | | |
|---|---|---|---|---|
| 5,096,268 A | * | 3/1992 | Schiel et al. | 303/114.1 |
| 5,152,587 A | * | 10/1992 | Volz | 303/114.3 |
| 5,176,433 A | * | 1/1993 | Byrnes et al. | 303/113.3 |
| 7,419,227 B2 | * | 9/2008 | Marlhe et al. | 303/113.4 |
| 7,686,404 B2 | * | 3/2010 | Lehmann et al. | 303/114.3 |
| 2005/0231027 A1 | * | 10/2005 | Giering et al. | 303/113.1 |

FOREIGN PATENT DOCUMENTS

JP    HEI 08-126113    5/1996
JP    2001-008306 A    1/2001

* cited by examiner

*Primary Examiner* — Xuan Lan Nguyen
(74) *Attorney, Agent, or Firm* — Young Basile

(57) ABSTRACT

A regenerative braking coordination device has a braking operating member receiving an input from a driver in the form of an operation amount, an input shaft operable for transmitting the operation amount, and a braking force boosting device operable to generate a hydraulic braking pressure corresponding to the operation amount transmitted by the input shaft. The device further includes a hydraulic pressure braking device to generate a braking force and an operation amount absorber for absorbing the operation amount of the input shaft. The operation amount absorber includes a cylinder, a piston dividing the interior of the cylinder into first and second hydraulic chambers and an orifice connecting the first and second hydraulic chambers. The orifice can be in the piston or in a flow channel.

5 Claims, 11 Drawing Sheets

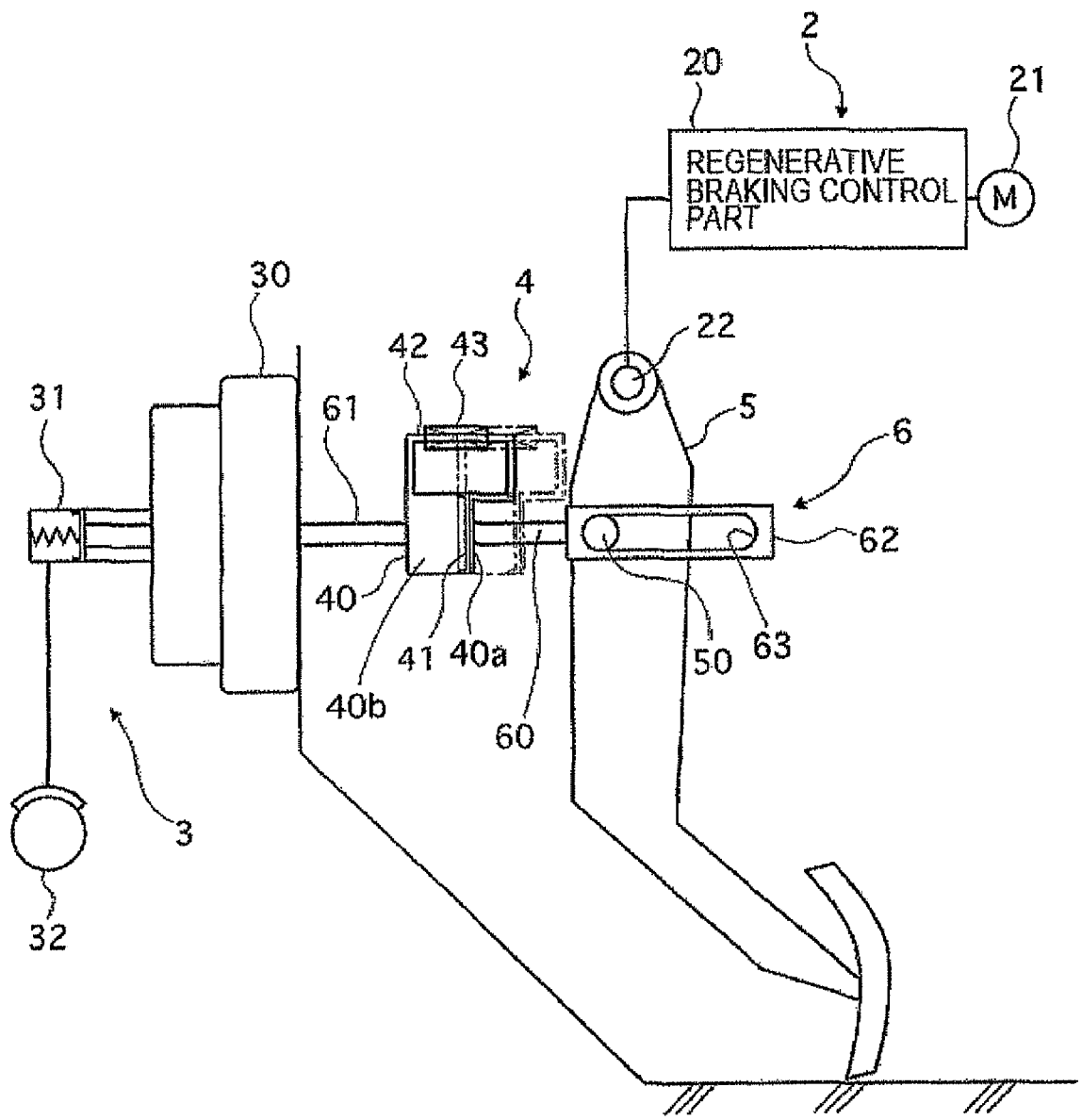

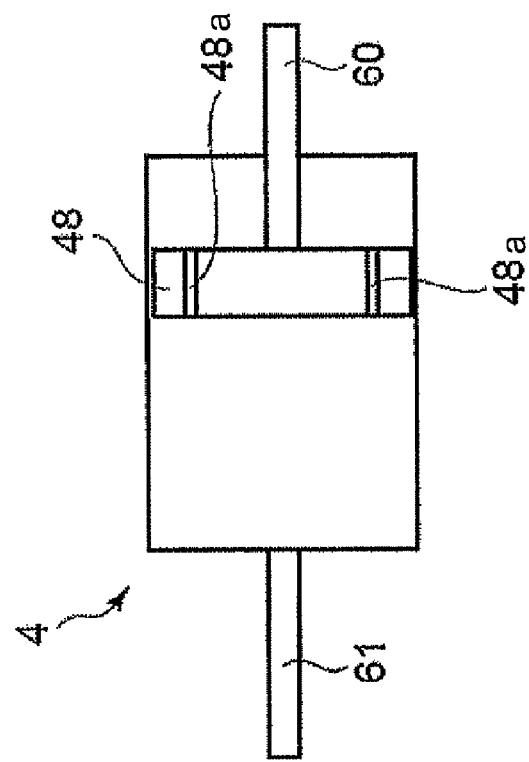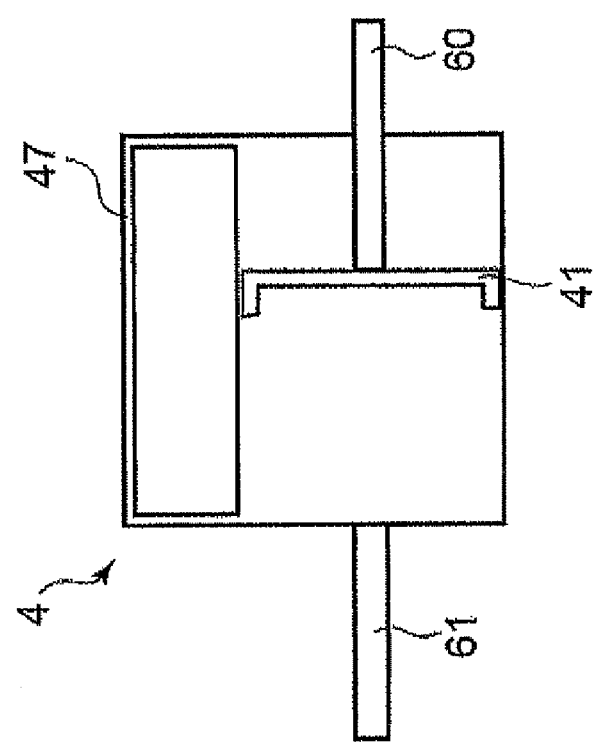

REGENERATIVE BRAKING COORDINATION DEVICE

CROSS-REFERENCE TO RELATED APPLICATION

This application claims priority from Japanese Patent Application Serial. No. 2007-010894, filed Jan. 20, 2007, and Japanese Patent Application Ser. No. 2007-333930, filed Dec. 26, 2007, each of which is incorporated herein in its entirety by reference.

TECHNICAL FIELD

The invention pertains generally to a regenerative braking coordination device that performs regenerative braking and hydraulic braking.

BACKGROUND

Japanese Kokai Patent Application Number Hei 11[1999]-171287 discloses that when a high braking force is required for rapid braking, both regenerative braking and friction braking are performed in order to guarantee the rapid braking response. The depression speed of the brake pedal is detected, and the higher the detected depression speed is, the smaller the proportion of the regenerative braking force is provided. The stroke speed (operating speed) of the brake pedal is detected from the moment that the brake pedal is depressed. When the operating speed becomes high enough, the friction braking proportion is increased.

BRIEF SUMMARY

Embodiments of a regenerative braking coordination device are taught herein. On such device includes, for example, a braking operating member configured to receive an input from a driver, the input corresponding to an operation amount, a braking force boosting device configured to generate a hydraulic braking pressure corresponding to the operation amount, an input shaft configured to transmit the operation amount to the braking force boosting device, a hydraulic pressure braking device configured to generate a braking force using the hydraulic braking pressure, and an operation amount absorber configured to absorb the operation amount. In this example, the operation amount absorber includes a cylinder, a piston dividing an interior of the cylinder into a first hydraulic chamber and a second hydraulic chamber and an orifice connecting the first hydraulic chamber and the second hydraulic chamber.

Another such device taught herein comprises, also by example, means for receiving an input from a driver, the input corresponding to an operation amount, means for generating a hydraulic braking pressure corresponding to the operation amount and means for transmitting the operation amount to the means for generating the hydraulic braking pressure. The device also includes means for generating a braking force using the hydraulic braking pressure and means for absorbing the operation amount. The means for absorbing the operation amount can include cylinder means for forming a first hydraulic chamber and a second hydraulic chamber and means for connecting the first hydraulic chamber and the second hydraulic chamber.

BRIEF DESCRIPTION OF THE DRAWINGS

The description herein makes reference to the accompanying drawings wherein like reference numerals refer to like parts throughout the several views, and wherein:

FIG. 3 is a diagram illustrating the state of regenerative braking coordination device during the rapid braking in the first embodiment;

FIGS. 11A and 11B are enlarged views of other embodiments of an operation amount absorbing part in the regenerative braking coordination device.

DETAILED DESCRIPTION OF EMBODIMENTS OF THE INVENTION

Figure 1:
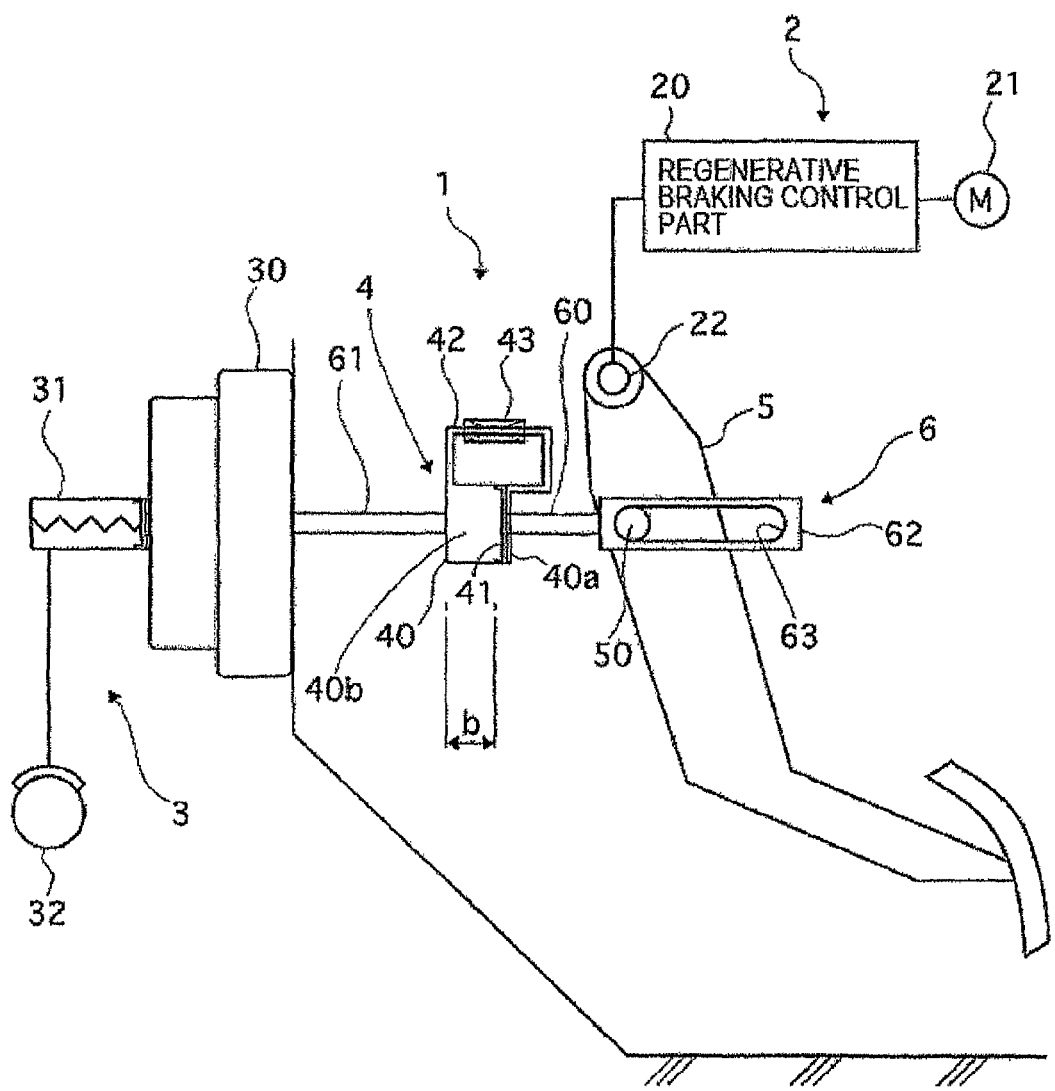
FIG. 1 is a diagram illustrating the assembly of the regenerative braking coordination device in a first embodiment.

FIG. 1 is a diagram illustrating the assembly of the regenerative braking coordination device 1 according to a first embodiment. The regenerative braking coordination device 1 includes a regenerative braking part 2 that generates braking force by means of regenerative braking by motor 21, a hydraulic braking part 3 and an input shaft 6 that transmits the operation amount input by a braking operating member, such as brake pedal 5, toward the side of hydraulic braking part 3. An operation amount absorbing part 4 absorbs the operation amount transmitted by input shaft 6.

The regenerative braking part 2 includes an operation amount sensor 22 that detects the operation amount of brake pedal 5, regenerative braking control part 20 that controls the regenerative braking force according to the operation amount detected by operation amount sensor 22, and a motor 21 that generates the regenerative braking force according to control by the regenerative braking control part 20. The regenerative braking control part 20 is, for example, a standard microcomputer including a central processing unit (CPU) operating instructions stored in read-only memory (ROM) programmed to perform the functions described herein. Of course, the regenerative braking control part 20 is not limited to this and could be application-specific (ASIC) or hardware-implemented.

The hydraulic braking part 3 includes an active booster 30, which generates an assisting force with respect to the operation force input to brake pedal 5, and at the same time, works as a hydraulic braking pressure generating source in the case of automatic braking control. A master cylinder 31 generates the hydraulic braking pressure, and wheel cylinders 32 generate the braking forces for the various wheels by means of the hydraulic braking pressure generated by master cylinder 31.

Corresponding to the operation amount transmitted by the input shaft 6, the active booster 30 controls the supply quantities of atmospheric pressure and vacuum pressure from the engine. The active booster 30 also makes use of the pressure differential between atmospheric pressure and vacuum pressure to generate an assisting force with respect to the depression force input to the brake pedal 5. Also, in the automatic braking control mode, the active booster 30 controls the supply quantities of atmospheric pressure and vacuum pressure from the engine by means of an actuator, and it produces the force acting on the master cylinder 31 by means of the pressure differential between the atmospheric pressure and the vacuum pressure. In the automatic braking control mode, a displacement amount locked to the operation of the active booster 30 is input to the input shaft 6.

The operation amount absorbing part 4 includes a cylinder 40 with its interior filled with working fluid, a piston 41 that divides the interior of cylinder 40 into the first hydraulic chamber 40a and second hydraulic chamber 40b, a hydraulic channel 42 that connects first hydraulic chamber 40a and second hydraulic chamber 40b, and an orifice 43 arranged in the hydraulic channel 42. The piston 41 is arranged such that the axial dimension of the second hydraulic chamber 40b is distance (b) when no operation force is input to the brake pedal 5. The distance (b) is selected according to the operation amount of brake pedal 5 for performing braking only by means of regenerative braking when brake pedal 5 is operated slowly.

The input shaft 6 includes a first input shaft 60 that connects piston 41 and brake pedal 5, a second input shaft 61 that connects active booster 30 and cylinder 40, and clevis 62 engaged to clevis pin 50 formed on brake pedal 5. Slot 63 is formed along the axial direction of input shaft 6 in clevis 62, and the latter is engaged to levis pin 50 formed projecting from the side surface of brake pedal 5. Because clevis pin 50 is engaged in slot 63, brake pedal 5 does not move when active booster 30 operates despite the fact that a displacement is applied to input shaft 6.

In the regenerative braking coordination device 1 according to the first embodiment, the regenerative braking and hydraulic braking are performed according to the operation amount of the brake pedal 5. In order to increase the electric power recovery rate, the proportion of regenerative braking force with respect to the total braking force is selected to be higher until maximum regenerative braking force is obtained. Consequently, it is necessary to reduce braking generation by the hydraulic braking means. However, when the operation speed of brake pedal 5 is high, it is necessary to generate the regenerative braking force and the hydraulic braking force from the range of a small operation amount of brake pedal 5 before maximum regenerative braking force is obtained. It is further desirable to improve the braking force generation response.

In the first embodiment, input shaft 6 has an operation amount absorbing part 4 that works such that when the operation speed of brake pedal 5 is low, the absorption amount of the operation amount transmitted by input shaft 6 is increased, and when the operation speed of brake pedal 5 is high, the absorption amount of the operation amount transmitted by input shaft 6 is reduced. Piston 41 and brake pedal 5 are connected to each other by first input shaft 60. Active booster 30 and cylinder 40 are connected by second input shaft 61.

Figure 2:
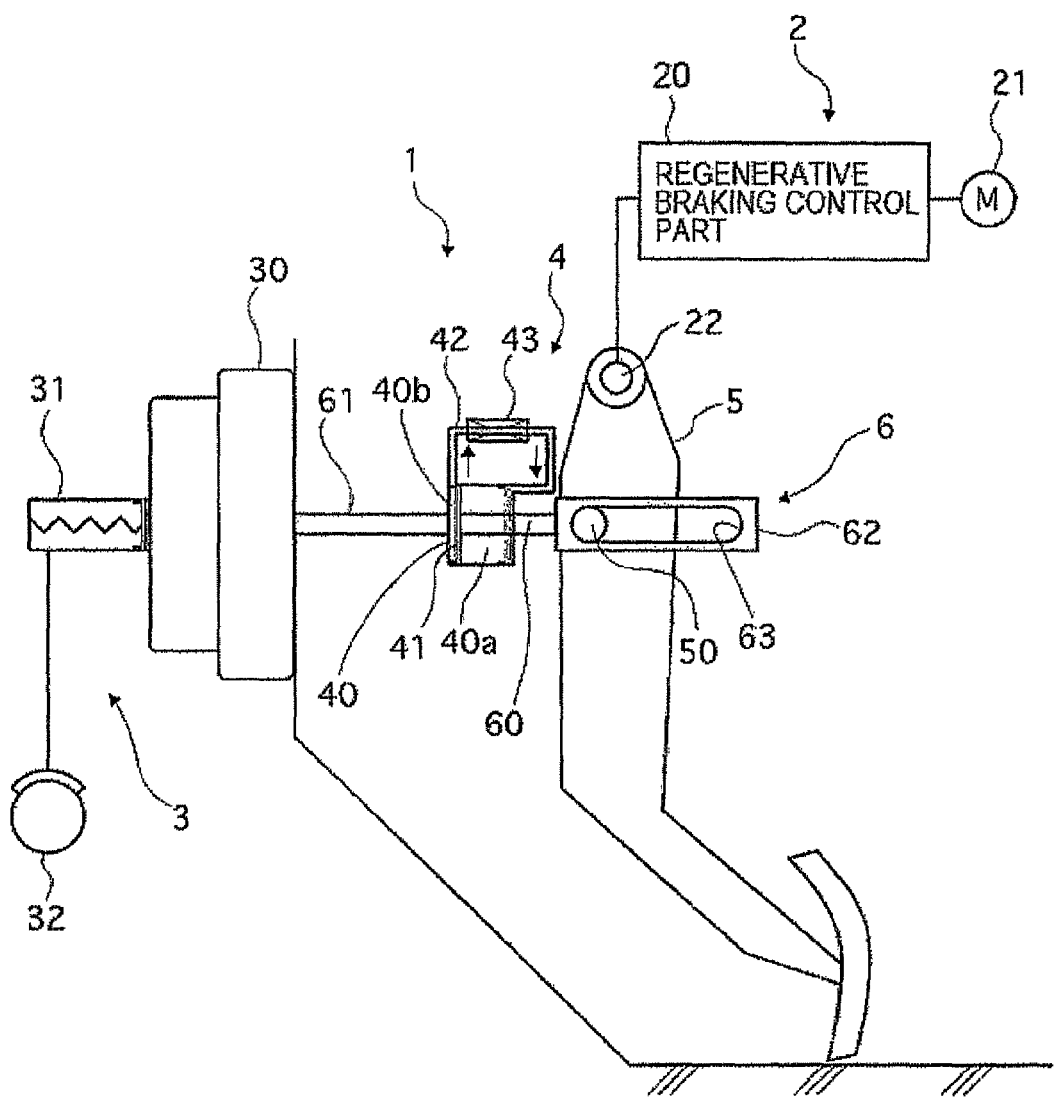
FIG. 2 is a diagram illustrating the state of the regenerative braking coordination device during normal braking in the first embodiment.

FIG. 2 is a diagram illustrating the state of regenerative braking coordination device 1 when the operation speed of brake pedal 5 is low. When the operation speed of brake pedal 5 is low, the working fluid in second hydraulic chamber 40b moves through hydraulic channel 42 into first hydraulic chamber 40a when the first input shaft 60 presses piston 41. Consequently, although the operation amount is input from the brake pedal 5 to the first input shaft 60, the cylinder 40 does not move within the range of movement of the piston 41, so that the operation amount is not transmitted to the second input shaft 61.

FIG. 3 is a diagram illustrating the state of regenerative braking coordination device 1 when the operation speed of brake pedal 5 is high. When the operation speed of the brake pedal 5 is high, although piston 41 is pressed by the first input shaft 60, the resistance in the orifice 43 prevents the working fluid from moving into the first hydraulic chamber 40a from the second hydraulic chamber 40b. Consequently, the piston 41 and cylinder 40 move together, so that the operation amount is transmitted from the first input shaft 60 to the second input shaft 61. As a result, the operation amount input to brake pedal 5 is transmitted to hydraulic braking part 3, the active booster 30 and master cylinder 31 are driven to move, and hydraulic braking is performed via the wheel cylinders 32.

Figure 4A:
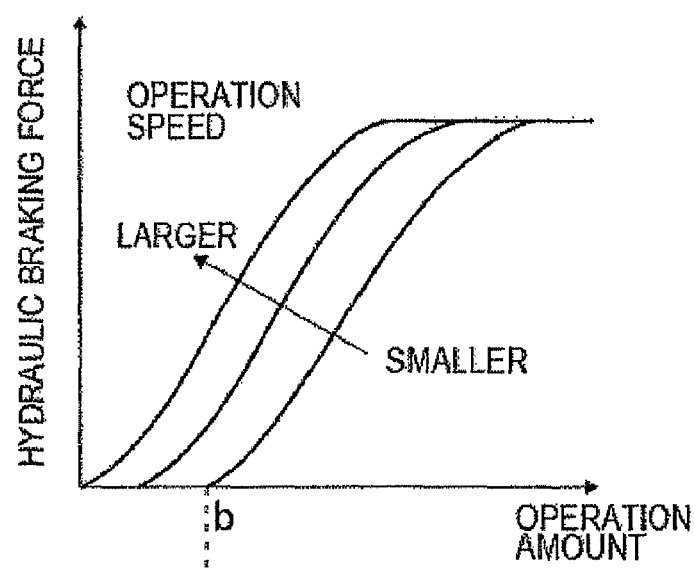
FIGS. 4A and 4B are graphs illustrating the hydraulic braking force and the regenerative braking force corresponding to the operation amount and the operation speed in the first embodiment.
Figure 4B:
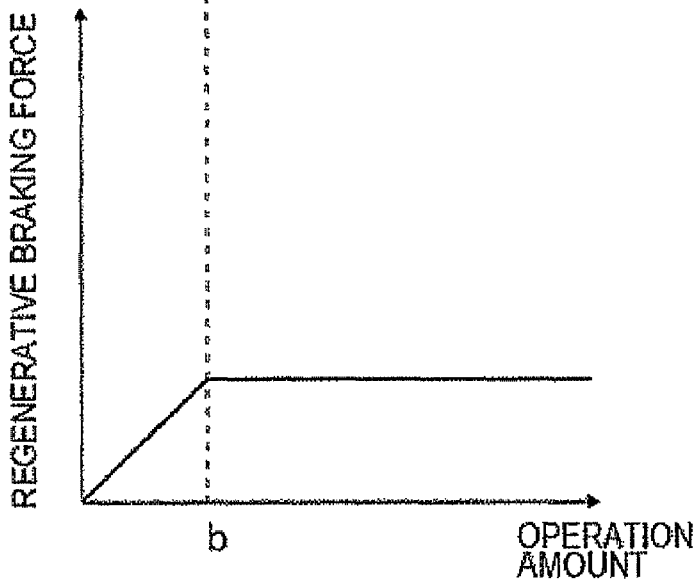

Due to the operation of orifice 43 as explained above, the operation amount generated by the hydraulic braking force changes corresponding to the operation speed of brake pedal 5. FIGS. 4A and 4B are graphs illustrating the hydraulic braking force and regenerative braking force corresponding to the operation amount and operation speed. As shown in FIG. 4A, the higher the operation speed of brake pedal 5, the smaller the operation amount generated by the hydraulic braking force. On the other hand, as shown in FIG. 4B, the operation amount generated by the regenerative braking force is constant and independent of the operation speed of brake pedal 5.

Figure 5:
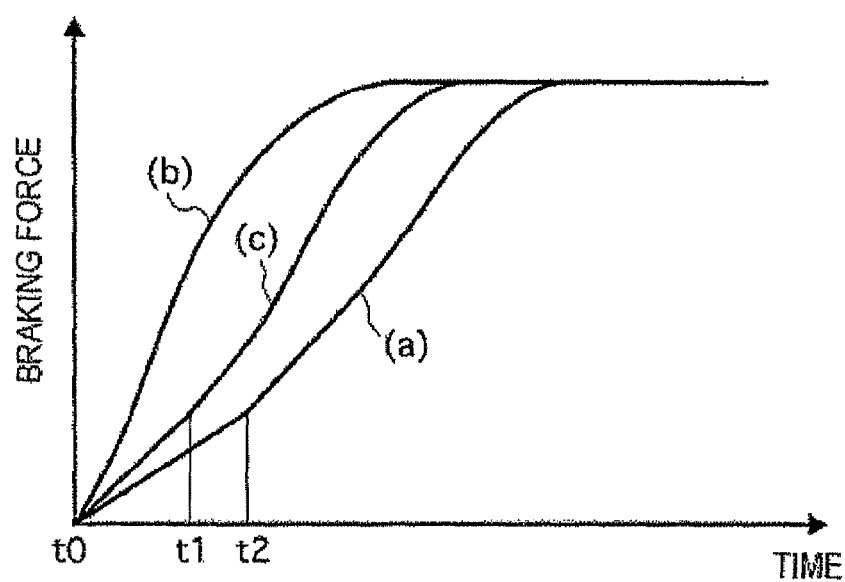
FIG. 5 is a time chart illustrating generation of the braking force in the first embodiment.

FIG. 5 shows time charts illustrating the generation of the braking force when the operation speed of the brake pedal 5 is low and high, respectively, wherein (a) shows the state when the operation speed is low, (b) shows the state when the operation speed is high, and (c) shows the state when the operation speed is high when orifice 43 is not provided.

When the operation speed of brake pedal 5 is low, from time t0 of the start of operation of brake pedal 5 to time t2, the operation amount of input shaft 6 is absorbed by means of operation amount absorbing part 4 so that only the regenerative braking force is generated. After time t2, absorption of the operation amount of input shaft 6 by the operation amount absorbing part 4 comes to an end, and hydraulic braking force is also generated. Consequently, both the regenerative braking force and the hydraulic braking force are generated. In contrast, in the period from time t0 to time t2, only a regenerative braking force is generated corresponding to the operation amount, and the proportion of regenerative braking force with respect to the total braking force can be increased. After time t2 it is possible to generate a higher braking force because both the regenerative braking force and the hydraulic braking force are generated.

When the operation speed of brake pedal 5 is high, the operation amount transmitted by input shaft 6 is not absorbed by the operation amount absorbing part 4 from time to when the operation of brake pedal 5 is started, so that the regenerative braking force and the hydraulic braking force are both generated.

On the other hand, if orifice 43 is not provided, when the operation speed of brake pedal 5 is high, the operation amount transmitted by the input shaft 6 is absorbed by the operation amount absorbing part 4 during the period from time to when the operation of brake pedal 5 is started up to time t1, so that only the regenerative braking force is generated. After time t1, absorption by operation amount absorbing part 4 of the operation amount transmitted by the input shaft 6 comes to an end, and the hydraulic braking force is also generated, so that both the regenerative braking force and hydraulic braking force are generated. As shown in FIG. 5 at lines (b) and (c), generation of hydraulic braking force is delayed when orifice 43 is not provided so that the braking force response is delayed compared to when orifice 43 is provided. That is, due to the operation of orifice 43, when brake pedal 5 is operated rapidly, it is possible to generate both the regenerative braking force and the hydraulic braking force from time t0, and therefore it is possible to generate a high braking force with excellent responsiveness.

The effects will now be explained. In the regenerative braking coordination device 1 the operation amount absorbing part 4 is provided to the input shaft 6 and functions so that when the operation amount of brake pedal 5 is lower, the absorption amount of the operation amount transmitted by the input shaft 6 is increased. Conversely, when the operation speed is higher, the absorption amount is decreased.

When the operation speed of brake pedal 5 is higher, because the absorption amount transmitted by the input shaft 6 and absorbed by the operation amount absorbing part 4 is smaller, the force boosting effect of the active booster 30 is generated earlier and a high hydraulic braking force is generated. It is possible at the same time to generate the regenerative braking force. Consequently, it is possible to generate a high braking force with excellent responsiveness. In addition, when the operation speed of brake pedal 5 is lower, because the absorption amount transmitted by input shaft 6 and absorbed by the operation amount absorbing part 4 is higher, the proportion of regenerative braking force with respect to the total braking force can be increased, and the electric power recovery rate can be increased.

The operation amount absorbing part 4 has a piston 41 that divides the interior of cylinder 40 into the first hydraulic chamber 40a and the second hydraulic chamber 40b. The operation amount absorbing part 4 also has a hydraulic channel 42 that connects first hydraulic chamber 40a and the second hydraulic chamber 40b, and an orifice 43 set in the hydraulic channel 42. Consequently, when the operation speed of brake pedal 5 is higher, because it is possible to set a smaller absorption amount transmitted by input shaft 6 and absorbed by the operation amount absorbing part 4, the regenerative braking force and hydraulic braking force can be generated earlier, and a high braking force can be generated with excellent responsiveness. In addition, when the operation speed of brake pedal 5 is lower, because it is possible to set a larger absorption amount transmitted by input shaft 6 and absorbed by operation amount absorbing part 4, the proportion of regenerative braking force with respect to total braking force can be increased, and the electric power recovery rate can be increased.

Figure 6:
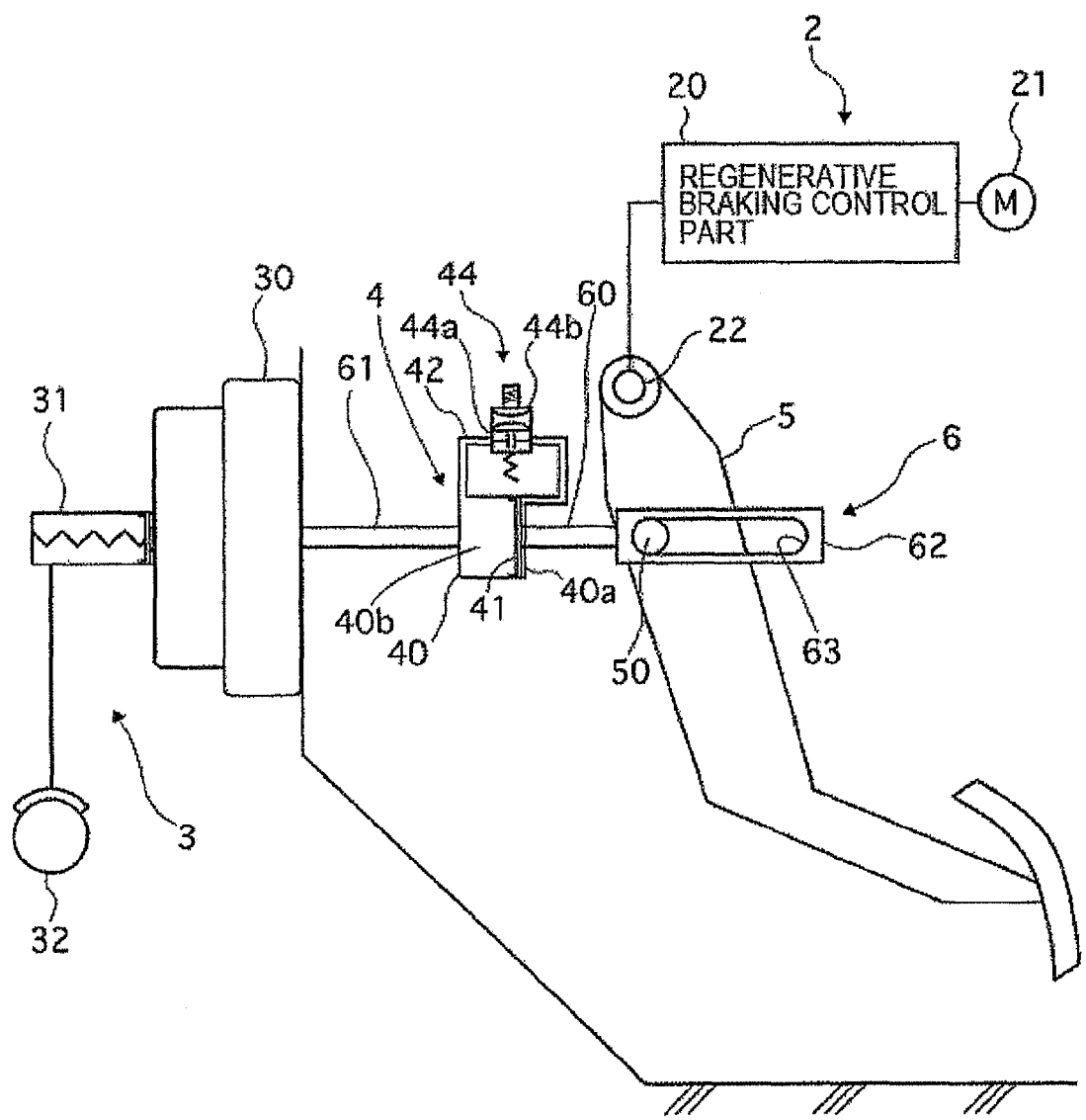
FIG. 6 is a diagram illustrating the assembly of the regenerative braking coordination device in a second embodiment.

In the first embodiment, the orifice 43 is arranged in the hydraulic channel 42. In the second embodiment as shown in FIG. 6, a switching valve 44 for switching between cutoff valve 44a and orifice 44b in the hydraulic channel 42 is provided. FIG. 6 is a diagram illustrating the assembly of regenerative braking coordination device 1 according to the second embodiment. The same part numbers as those adopted in the first embodiment are adopted for the same structural parts, and they are not explained again.

In the second embodiment, the switching valve 44 is arranged in the hydraulic channel 42 of the operation amount absorbing part 4. In the event of failure of the regenerative braking part 2 due to malfunctions or the like, the switching valve 44 is turned OFF so that the hydraulic channel 42 is blocked by the cutoff valve 44a. When the regenerative braking part 2 is in the normal state, the switching valve 44 is turned ON, and the hydraulic channel 42 is connected by the orifice 44b. That is, when regenerative braking part 2 fails, the hydraulic channel 42 is blocked by the cutoff valve 44a so that when brake pedal 5 is operated the working fluid does not move from the second hydraulic chamber 40b into the first hydraulic chamber 40a. Consequently, the piston 41 does not move with respect to cylinder 40 so that the operation amount input to the first input shaft 60 is transmitted to the second input shaft 61. That is, the operation amount input to the brake pedal 5 is transmitted to the hydraulic braking part 3, and active booster 30 and master cylinder 31 are driven to move so that hydraulic braking is performed via wheel cylinders 32. As a result, even when regenerative braking part 2 fails it is still possible to perform hydraulic braking to guarantee the braking force with high reliability. In the second embodiment, a cutoff valve 44a is provided that blocks the hydraulic channel 42 when the regenerative braking part 2 fails.

Consequently, when the regenerative braking part 2 fails the operation amount input by input shaft 6 is not absorbed by the operation amount absorbing part 4, hydraulic braking is performed irrespective of the operation amount and operation speed of brake pedal 5, and it is possible to guarantee braking force with high reliability.

In the first and second embodiments the slot 63 is formed in the clevis 62 along the axial direction of input shaft 6. Because the clevis pin 50 is engaged in slot 63, the brake pedal 5 does not move even when the input shaft 6 is displaced by operation of active booster 30. In the third embodiment, the operation amount absorbing part 4 prevents the brake pedal 5 from moving even when the active booster 30 works and a displacement is applied to the input shaft 6.

Figure 7:
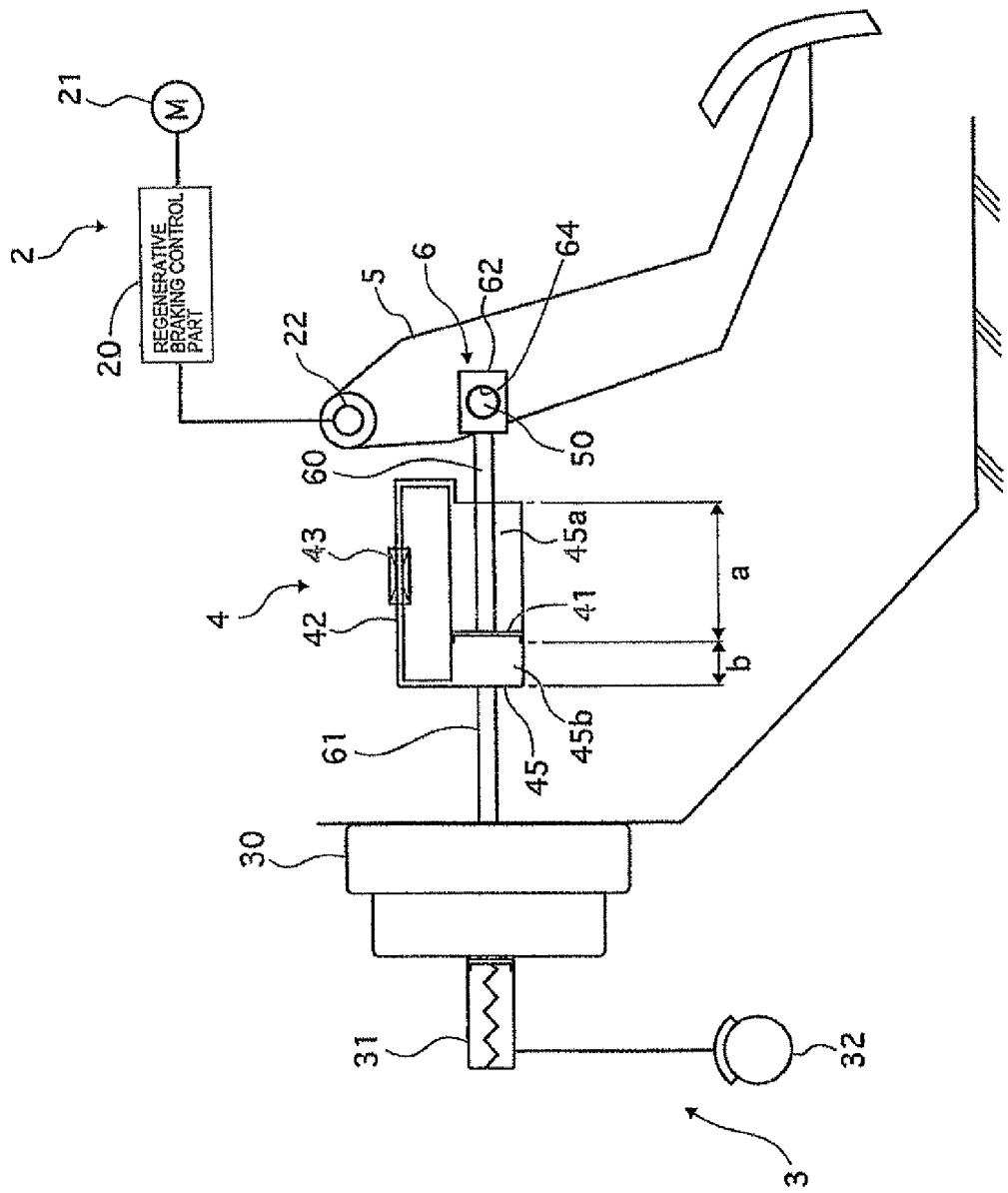
FIG. 7 is a diagram illustrating the assembly of the regenerative braking coordination device in a third embodiment.

FIG. 7 is a diagram illustrating the assembly of the regenerative braking coordination device 1 according to the third embodiment. The same part numbers as those adopted in the first and second embodiments are also adopted here to represent the same structural parts, and they are not explained again.

In FIG. 7, the engagement aperture 64 engaged with the clevis pin 50 of the brake pedal 5 is formed in the clevis 62 of the input shaft 6. The clevis pin 50 is rotatably engaged in the engagement aperture 64. The operation amount absorbing part 4 is composed of a cylinder 45 filled with working fluid, a piston 41 that divides the interior of cylinder 45 into the first hydraulic chamber 45a and the second hydraulic chamber 45b, a hydraulic channel 42 that connects the first hydraulic chamber 45a and second hydraulic chamber 45b, and an orifice 43 set in the hydraulic channel 42. The piston 41 is arranged such that when the brake pedal 5 is not depressed, the axial dimension of first hydraulic chamber 45a is distance (a) and the axial dimension of second hydraulic chamber 45b is distance (b). The distance (a) is set to correspond to the displacement applied to second input shaft 61 in the automatic braking by the active booster 30, and distance (b) is set to correspond to the operation amount of the brake pedal 5 when braking is mainly performed only by regenerative braking in the normal braking operation.

Operation of the third embodiment is now explained. Because cylinder 45 is pulled by second input shaft 61, when automatic braking is performed by means of the active booster 30, the working fluid in first hydraulic chamber 45a moves through the hydraulic channel 42 and releasing it into the second hydraulic chamber 45b. Consequently, although the displacement is applied to the second input shaft 61 due to the movement of the cylinder 45, the piston 41 does not move, so that the displacement is not transmitted to the first input shaft 60. Consequently, no force acts on the side of brake pedal 5, and it is possible to prevent the movement of brake pedal 5 in the automatic braking operation.

As a result, the active booster 30 automatically generates hydraulic braking pressure and creates a displacement of the input shaft 6 when the hydraulic braking pressure is generated automatically. The operation amount absorbing part 4 absorbs the operation amount transmitted by the input shaft 6 and the displacement of the input shaft 6 by the active booster 30.

Consequently, even when the hydraulic braking pressure is generated automatically by the active booster 30, the operation amount absorbing part 4 prevents any force from acting on the side of the brake pedal 5 so that it is possible to prevent movement of the brake pedal 5.

According to the first three embodiments, orifice 43 (or orifice 44b in the second embodiment) having equal forward and backward resistance to the working fluid is arranged in hydraulic channel 42.

In the fourth embodiment, orifice 46 having different forward and backward resistances to the working fluid is arranged in the hydraulic channel 42. With respect to the speed with which brake pedal 5 is depressed, the speed of the return operation is lower, improving the operation fuel feel.

Figure 8:
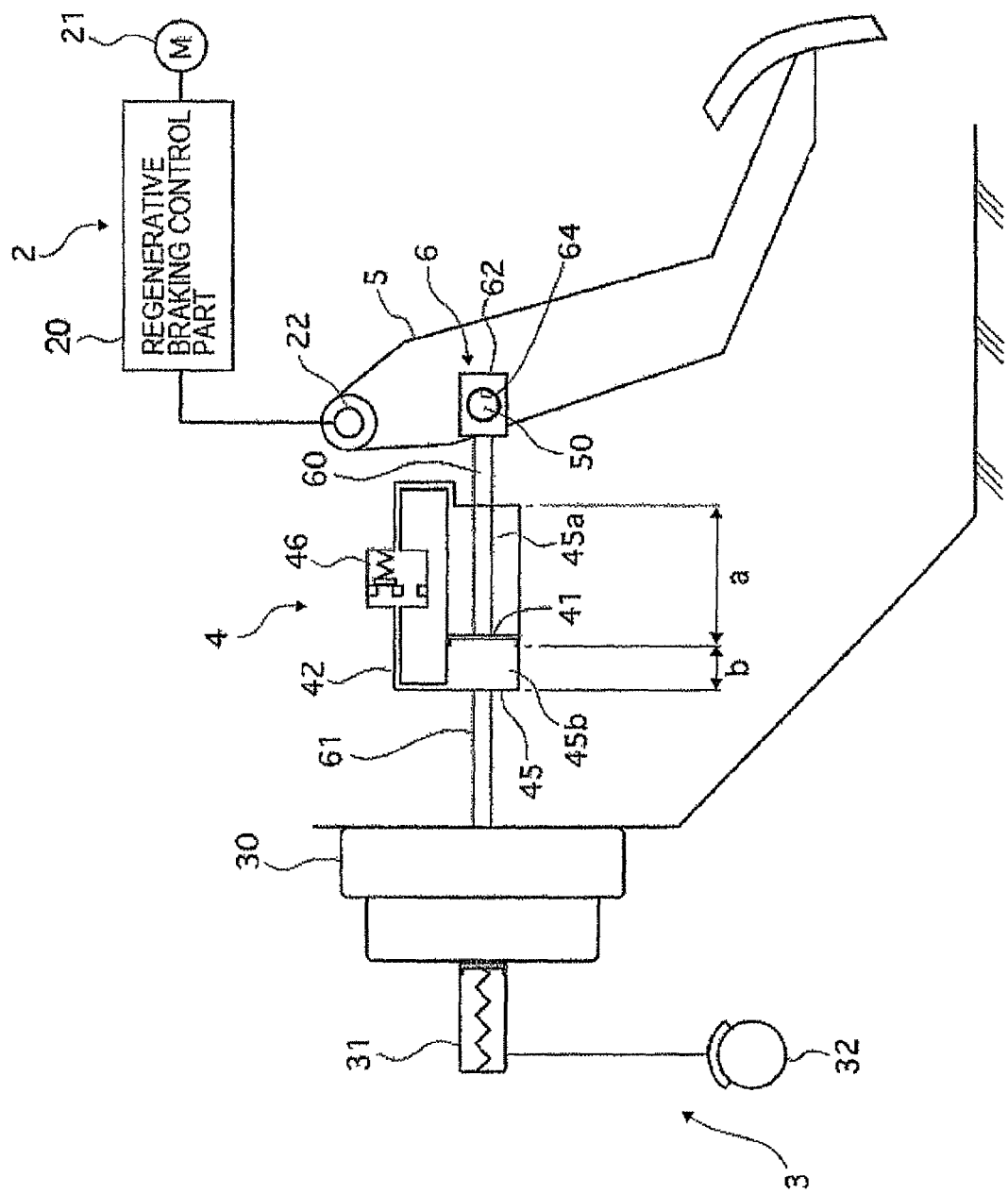
FIG. 8 is a diagram illustrating the assembly of the regenerative braking coordination device in a fourth embodiment.

FIG. 8 is a diagram illustrating the assembly of the regenerative braking coordination device 1 of the operation amount absorbing part 4 in the fourth embodiment. The same part numbers as those adopted in the previous embodiments are adopted to represent the same structural parts, and they are not explained again.

Figure 9A:
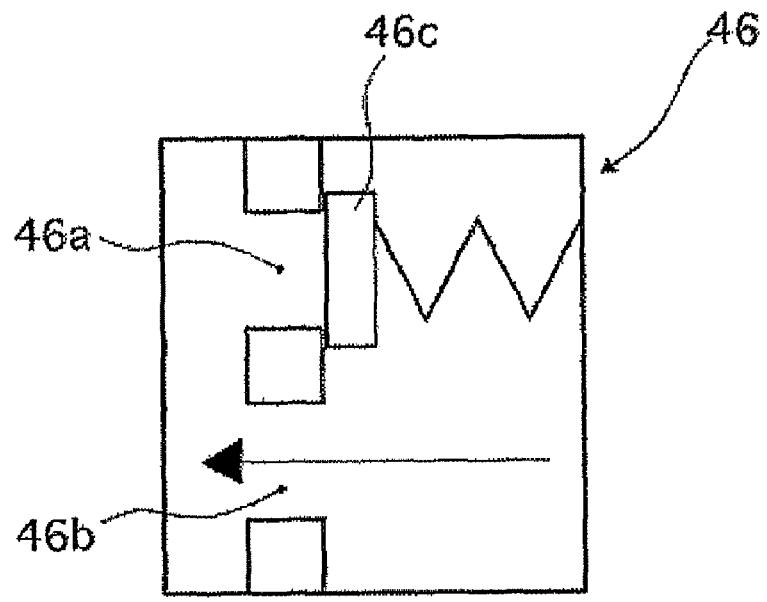
FIGS. 9A and 9B are each an enlarged view of the orifice in the fourth embodiment, with FIG. 9A showing a closed cutoff valve and FIG. 9B showing an opened cutoff valve.
Figure 9B:
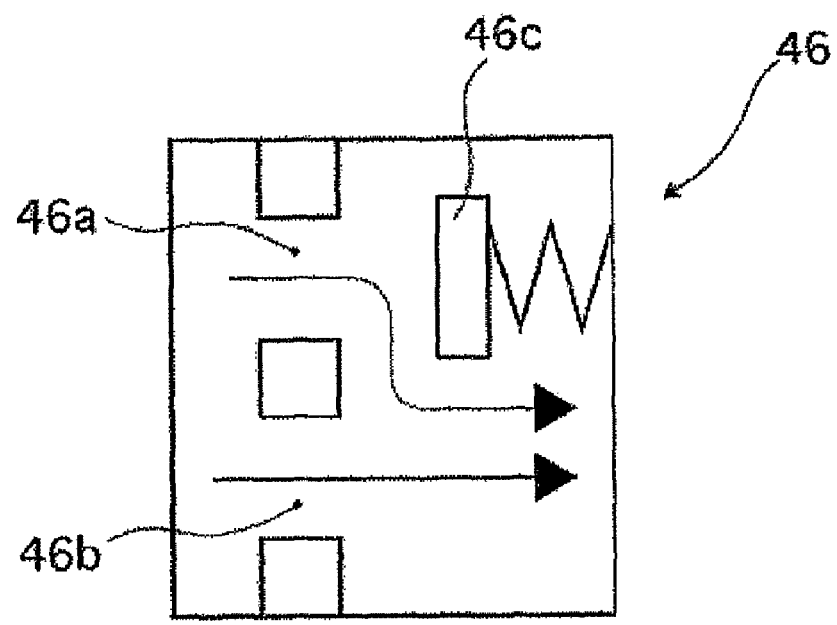

The orifice 46 is arranged in the hydraulic channel 42. FIGS. 9A and 9B are enlarged views of the orifice 46. As shown therein, a first channel 46a and a second channel 46b are formed as orifice 46. The first channel 46a has a cutoff valve 46c arranged therein. The valve 46c opens when the working fluid moves from the second hydraulic chamber 45b to the side of first hydraulic chamber 45a (forward), and the valve closes when the working fluid moves from the first hydraulic chamber 45a to the side of second hydraulic chamber 45b (backward). As shown in FIG. 9A, the first channel 46a is blocked by cutoff valve 46c during the backward movement, and the working fluid passes only through second channel 46b. As shown in FIG. 9B, the first channel 46a is opened by cutoff valve 46c during the forward movement, and the working fluid passes through both the first channel 46a and the second channel 46b.

The diameter of the orifice 46 for letting the working fluid pass through when brake pedal 5 performs the return operation is smaller than the diameter of orifice 46 for letting the working fluid pass through when the brake pedal 5 is depressed. The operation amount transmitted by the input shaft 6 is absorbed during the forward movement, so that the backward resistance is higher than the forward resistance. Consequently, it is possible to set the speed in the return operation to be lower than that when brake pedal 5 is depressed.

Just as in the first embodiment, the pair of first channel 46a and second channel 46b enable setting a smaller operation amount transmitted by the input shaft 6 and absorbed by operation amount absorbing part 4 when the operation speed of brake pedal 5 is higher. Consequently, regenerative braking force and hydraulic braking force are generated earlier, and it is possible to generate a high braking force with excellent responsiveness. In addition, when the operation speed of brake pedal 5 is lower, it is possible to set a higher absorption amount transmitted by the input shaft 6 and absorbed by the operation amount absorbing part 4.

The effects of the regenerative braking coordination device 1 in the fourth embodiment are explained hereinafter. For orifice 46, the diameter for the backward side is selected to be smaller than that when the operation amount transmitted by input shaft 6 is absorbed. Consequently, it is possible to have the backward resistance be higher than the forward resistance, so that the speed in performing the return operation can be set lower than when brake pedal 5 is depressed and so that the operation feel can be improved.

The invention has been explained with reference to four embodiments. However, the specific assembly of the invention is not limited to these four embodiments. The invention also includes alterations in these designs. For example, in the first and second embodiments, a regenerative braking coordination device 1 using an active booster 30 has been described as an example. However, a conventional brake boosting device can also be used as the active booster 30. That is, any regeneration brake and hydraulic brake using a brake boosting device may be adopted.

Figure 10:
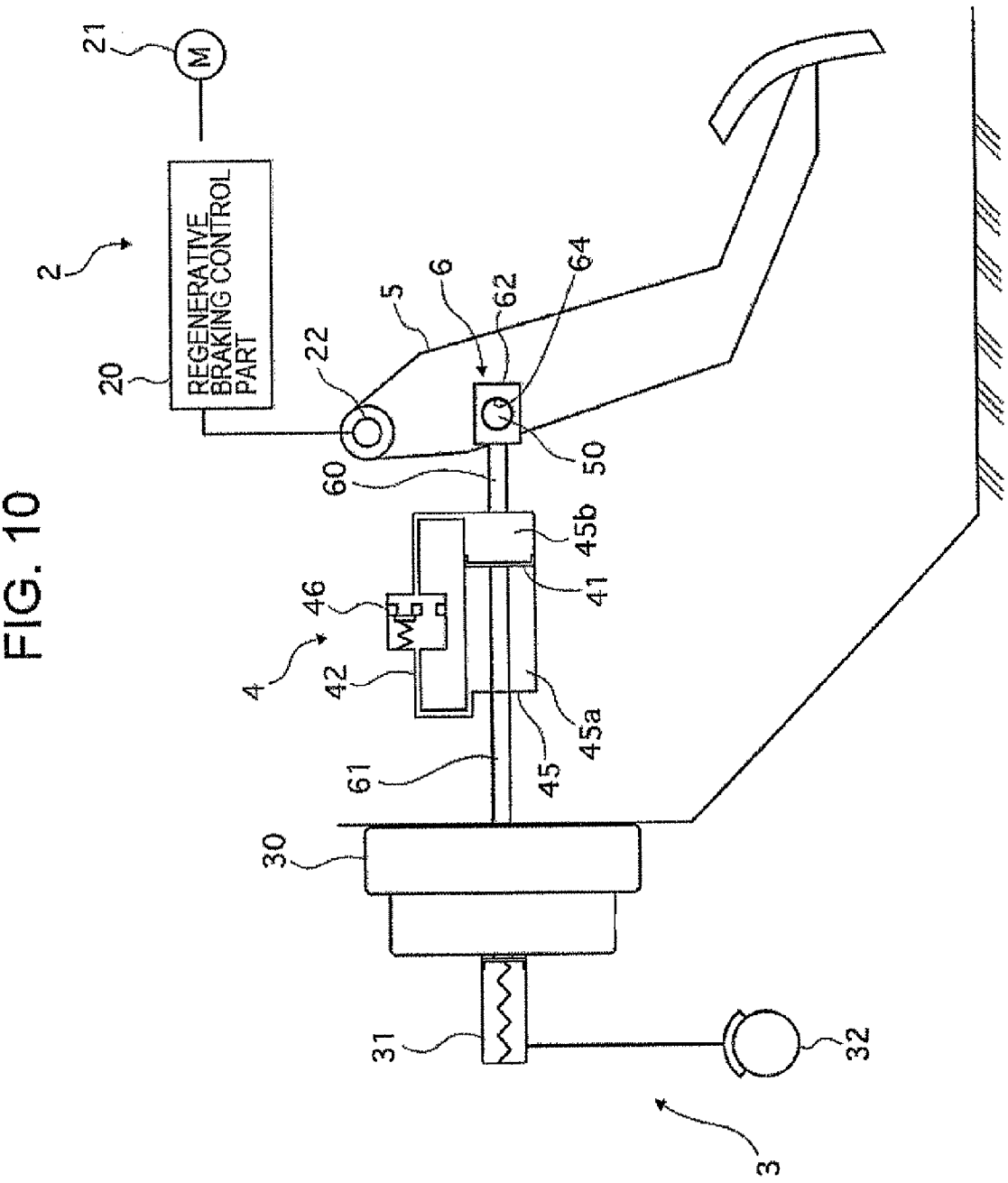
FIG. 10 is a diagram illustrating the assembly of the regenerative braking coordination device in another embodiment.

In the described embodiments, the first input shaft 60 is connected to the piston 41 and the brake pedal 5, and second input shaft 61 is connected to the active booster 30 and cylinder 45 (or cylinder 40 in the first and second embodiments). However, the scheme shown in FIG. 10 can also be adopted for this assembly, in which the first input shaft 60 is connected to the cylinder 45 and brake pedal 5, and the second input shaft 61 is connected to the active booster 30 and piston 41.

Also, as shown in FIG. 11A, the operation amount absorbing part 4 is provided with a hydraulic channel 47 that connects the first hydraulic chamber 45a and second hydraulic chamber 45b. The diameter of hydraulic channel 47 is made narrow such that the effect of an orifice can be realized. As shown in FIG. 11B, a piston 48 that divides the interior into the first hydraulic chamber 45a and the second hydraulic chamber 45b is provided inside the cylinder 45. Further, a narrow channel 48a for connecting the first hydraulic chamber 45a and the second hydraulic chamber 45b may be formed in piston 48 to exhibit the effect of the orifice.

The effect of the regeneration braking coordination device 1 as show in FIGS. 11A and 11B is explained next. The hydraulic channel 47 and the narrow channel 48a have the effect of an orifice when the operation speed of brake pedal 5 is higher. Consequently it is possible to miniaturize the operation amount absorbing part 4.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A regenerative braking coordination device, comprising:
    a braking operating member configured to receive an input from a driver, the input corresponding to an operation amount;
    a braking force boosting device configured to generate a hydraulic braking pressure corresponding to the operation amount;
    an input shaft configured to transmit the operation amount to the braking force boosting device;
    a hydraulic pressure braking device configured to generate a braking force using the hydraulic braking pressure;

an operation amount detector configured to detect the operation amount;

a regenerative braking control part configured to generate a braking force using a motor, the braking force corresponding to the operation amount;

a cutoff valve configured to block the orifice when at least one of the operation amount detector, the regenerative braking control part and the motor fails; and an operation amount absorber configured to absorb the operation amount, the operation amount absorber including:
- a cylinder;
- a piston dividing an interior of the cylinder into a first hydraulic chamber and a second hydraulic chamber; and
- an orifice connecting the first hydraulic chamber and the second hydraulic chamber.

2. The device according to claim 1, further comprising:
a flow channel connecting the first hydraulic chamber and the second hydraulic chamber; and wherein
the orifice is in the flow channel.

3. The device according to claim 2, further comprising:
an active booster configured to control displacement of the input shaft; and
an absorber on at least one side of the second hydraulic chamber configured to absorb the displacement caused by the active booster.

4. The device according to claim 1, further comprising:
an active booster configured to control displacement of the input shaft; and
an absorber on at least one side of the second hydraulic chamber configured to absorb the displacement caused by the active booster.

5. A regenerative braking coordination device, comprising:
means for receiving an input from a driver, the input corresponding to an operation amount;
means for generating a hydraulic braking pressure corresponding to the operation amount;
means for transmitting the operation amount to the means for generating the hydraulic braking pressure;
means for generating a braking force using the hydraulic braking pressure;
means for detecting the operation amount;
means for generating a braking force using a motor, the braking force corresponding to the operation amount;
means for blocking the orifice when at least one of the means for detecting the operation amount, the means for generating a braking force using a motor, and the motor fails; and
means for absorbing the operation amount including:
- cylinder means for forming a first hydraulic chamber and a second hydraulic chamber; and
- means for connecting the first hydraulic chamber and the second hydraulic chamber.

* * * * *